United States Patent [19]

Wong et al.

[11] Patent Number: 5,837,043

[45] Date of Patent: Nov. 17, 1998

[54] INKS WITH ALCOHOL SURFACTANTS

[75] Inventors: Raymond W. Wong; Marcel P. Breton; Yvan Gagnon, all of Mississauga, Canada

[73] Assignee: Xerox Corporation, Stamford, Conn.

[21] Appl. No.: 782,725

[22] Filed: Jan. 13, 1997

[51] Int. Cl.⁶ ................................................ C09D 11/02
[52] U.S. Cl. .................... 106/31.58; 106/31.59; 106/31.86; 106/31.89
[58] Field of Search ............................ 106/31.89, 31.86, 106/31.59, 31.58

[56] References Cited

U.S. PATENT DOCUMENTS

| | | | |
|---|---|---|---|
| 4,463,359 | 7/1984 | Ayata et al. | 346/1.1 |
| 4,508,570 | 4/1985 | Fujii et al. | 106/31.58 |
| 4,840,674 | 6/1989 | Schwarz | 106/22 |
| 5,019,166 | 5/1991 | Schwarz | 106/31.59 |
| 5,021,802 | 6/1991 | Allred | 346/1.1 |
| 5,041,161 | 8/1991 | Cooke et al. | 106/22 |
| 5,043,084 | 8/1991 | Gutierrez et al. | 252/47 |
| 5,065,167 | 11/1991 | You et al. | 346/1.1 |
| 5,129,948 | 7/1992 | Breton et al. | 106/31.43 |
| 5,302,197 | 4/1994 | Wickramanayke et al. | 106/31.77 |
| 5,395,434 | 3/1995 | Tochihara et al. | 106/31.59 |
| 5,441,561 | 8/1995 | Chujo et al. | 106/31.28 |
| 5,501,725 | 3/1996 | Lauw et al. | 106/31.89 |
| 5,534,051 | 7/1996 | Lauw | 106/31.43 |
| 5,536,306 | 7/1996 | Johnson et al. | 106/31.58 |
| 5,626,655 | 5/1997 | Pawlowski et al. | 106/31.43 |
| 5,658,376 | 8/1997 | Noguchi et al. | 106/31.59 |

*Primary Examiner*—Helene Klemanski
*Attorney, Agent, or Firm*—E. O. Palazzo

[57] ABSTRACT

An imaging process which comprises the development of an image with an aqueous ink jet ink composition comprised of pigment, water, and an alcohol surfactant comprised of a mixture of linear secondary alcohols, and which mixture has been reacted with ethylene oxide.

35 Claims, No Drawings

INKS WITH ALCOHOL SURFACTANTS

BACKGROUND OF THE INVENTION

The present invention is generally directed to aqueous ink compositions. More specifically, the present invention is directed to pigmented aqueous ink compositions particularly suitable for use in ink jet printing processes, and especially thermal ink jet processes, and wherein paper curl is minimized and image smearing is minimal, or avoided, the inks possess high temperature surface activity, that is the surfactant is still active at high temperature, for example it will not phase separate when the temperature of the ink is increased in the printhead or on the paper if a heater is used to dry the ink, and wherein the surfactants selected in embodiments possess high values of Hydrophile-Lipophile-Balance (HLB). In embodiments, the present invention relates to imaging processes with ink jet inks comprised of water, pigment, and a certain alcohol surfactant, and which surfactant is present in the important amounts of from about 0.005, or about 1 to about 40, and preferably from 2 to 20 weight percent or parts. Moreover, images developed with the inks of the present invention in embodiments enable ink jet prints of excellent resolution, acceptable density, excellent waterfastness, minimum or very low showthrough, and excellent MFLEN.

The HLB number is an indication of the hydrophilic composition portion of the nonionic emulsifier molecule. Thus, if a nonionic emulsifier were 100 percent hydrophilic, it would have an HLB of 100. In the ICI system, such an emulsifier would be assigned an HLB value of 20. The HLB values of most polyol fatty acid esters can be calculated with the formula HLB equals 20 (1-S/A) where S is the saponification number of the ester and A the acid number of the recovered acid. When the hydrophilic portion is comprised of ethylene oxide only, the formula is HLB=W/5 where W is the weight percent oxyethylene content (Morgan, P.W., *Determination of Ethers and Esters of Ethylene Glycol, Ind. and Eng. Chem., Anal. Ed.*, Vol. 18, page 500, 1946). The HLB values of ionic surfactants can be determined experimentally by comparison with surfactants of known HLB values. An approximate value of HLB can be obtained by determining the solubility of the surfactant in water: No dispersibility in water, HLB=about 1 to 4; poor dispersion, HLB=about 3 to 6; milky dispersion after vigorous agitation, HLB=about 6 to 8; stable milky dispersion, HLB=about 8 to 10; translucent to clear dispersion, HLB=about 10 to 13; clear solution, HLB=greater than about 13.

PRIOR ART

Ink jet printing can be considered a non-impact method that generates droplets of ink that are deposited on a substrate, such as paper or a transparent film, in response to an electronic digital signal. Thermal or bubble jet drop-on-demand ink jet printers are useful as outputs for personal computers in the office and the home.

In existing thermal ink jet printing, the printhead typically comprises one or more ink jet ejectors, such as disclosed in U.S. Pat. No. 4,463,359, the disclosure of which is totally incorporated herein by reference, each ejector including a channel communicating with an ink supply chamber, or manifold at one end and having an opening at the opposite end, referred to as a nozzle. A thermal energy generator, usually a resistor, is located in each of the channels, a predetermined distance from the nozzles. The resistors are individually addressed with a current pulse to momentarily vaporize the ink and form a bubble which expels an ink droplet. As the bubble grows, the ink rapidly bulges from the nozzle and is momentarily contained by the surface tension of the ink as a meniscus. This is a temporary phenomenon, and the ink is quickly propelled toward a print sheet. As the bubble begins to collapse, the ink in the channel between the nozzle and bubble starts to move toward the collapsing bubble causing a volumetric contraction of the ink at the nozzle and resulting in the separation from the nozzle of the bulging ink as a droplet. The feed of additional ink provides the momentum and velocity for propelling the droplet toward a print sheet, such as a piece of paper. Since the droplet of ink is emitted only when the resistor is actuated, this type of thermal ink jet printing is known as "drop-on-demand" printing. Other types of ink jet printing, such as continuous-stream or acoustic, are also known.

With single-color ink jet printing apparatus, the printhead typically comprises a linear array of ejectors, and the printhead is moved relative to the surface of the print sheet, either by moving the print sheet relative to a stationary printhead, or vice-versa, or both. In some types of apparatus, a relatively small printhead moves across a print sheet numerous times in swathes, much like a typewriter. Alternatively, a printhead which consists of an array of ejectors and extends the full width of the print sheet may be passed once down the print sheet to give full-page images in what is known as a "full-width array" (FWA) printer. When the printhead and the print sheet are moved relative to each other, imagewise digital data is used to selectively activate the thermal energy generators in the printhead over time so that the desired image will be created on the print sheet. With the demand for higher resolution printers, the nozzles in ink jet printers are decreasing in size. Nozzle openings are typically about 50 to 80 micrometers in width or diameter for 300 spi printers. With the advent of 600 spi printers, these nozzle openings are typically about 10 to about 40 micrometers in width or diameter. These small dimensions require inks that do not plug the small openings.

Therefore, an important requirement for ink jet ink is the ability of the ink to be stable with minimal or no settling, the ability of the ink to remain in a fluid condition in a printhead opening on exposure to air, and moreover, wherein when the inks are selected for ink jet printing there is minimized paper curl, or wherein paper curl can be controlled. Another important measured property for an ink jet ink is the latency or decap time, which is the length of time over which an ink remains fluid in a printhead opening or nozzle when exposed to air and, therefore, capable of firing a drop of ink at its intended target. Latency is the maximum idling time allowed for the ink to be jetted by a printer with a speed equal to or greater than 5 m/s (equivalent to an ink traveling a distance of 0.5 millimeter in less than 100 $\mu$s) without a failure. This test is usually completed with the printhead or nozzles uncovered or decapped, and generally at a relative humidity of 15 percent. The time interval is usually the longest length of time that the printhead, uncovered, will still fire, or generate a specified drop without drop displacement or loss of density. The longer the latency time rating, the more desirable the ink. The inks of the present invention possess many of these characteristics in embodiments thereof.

Moreover, an important requirement for ink jet inks, especially for pigments, such as carbon black, based inks, is for the pigment dispersion to remain stable throughout the life of the ink jet cartridge. Dye-based ink jet inks suffer from deficiencies in waterfastness, smear resistance and lightfastness after being printed on various substrates. Pigments provide an image, on a wide variety of substrates, having high optical density with high waterfastness, excellent smear resistance and acceptable lightfastness. Therefore, pigments are a preferred alternative to dyes, provided the pigment dispersions can be stabilized to prevent flocculation and/or aggregation and settling. Cosolvents that may function as ink clogging inhibitors usually cause destabilization of the pigment dispersions and, therefore, are usually not used in pigmented inks.

There is thus a need for aqueous ink compositions that can be utilized in high resolution ink jet printers. Additionally, there is a need for pigmented inks that provide high latency and also remain stable for extended time periods, and throughout the life of the ink jet cartridge. There is also a need for pigmented inks that provide high optical density in a single application or pass. More importantly, there is a need for ink jet inks wherein paper curl, and/or image smearing can be eliminated or minimized when such inks are selected for ink jet printing processes. These and other needs may be achievable in embodiments of the present invention.

SUMMARY OF THE INVENTION

The present invention relates to an aqueous ink jet ink composition comprised of water, pigment particles, and which particles in embodiments having a particle size distribution where at least 70 percent of the particles have a diameter below about 0.1 micron with the remaining particles in the dispersion possessing a diameter of less than or equal to about 1 micron, and certain alcohols. More specifically, the inks of the present invention are comprised of a major amount of water, pigment particles, especially carbon black, and alcohol surfactants comprised of a mixture of linear secondary alcohols, and which alcohols have been reacted, or are reacted with ethylene oxide. The inks in embodiments possess, for example, a latency of at least about 20 seconds in a printer having at least one nozzle of a channel width or diameter ranging from 10 to about 40 microns, and wherein the paper curl is minimized or eliminated. Also, the present invention relates to a high resolution printing process comprising applying the ink composition in imagewise fashion to a substrate.

Important embodiments of the present invention include an imaging process which comprises the development of an image with an aqueous ink jet ink composition comprised of pigment, water, and the alcohol surfactant mixture reaction product present in an effective amount of, for example, from about 2 to about 50 weight percent; an imaging process which comprises the development of an image with an aqueous ink jet ink composition comprised of pigment, water, and the alcohol surfactant reaction product present in an amount of from about 1 to about 15 weight percent and wherein images with minimal curling and minimal smearing are obtained; a high resolution printing process comprising applying in imagewise fashion to a substrate in a printer having at least one nozzle of a channel width or diameter ranging from about 10 to about 40 microns an aqueous ink jet ink composition comprised of pigment, water, and alcohol surfactant mixture product; a process for reducing or eliminating paper curl in a xerographic ink jet apparatus which comprises generating images in the apparatus and developing the images with an aqueous ink jet ink composition comprised of pigment, water, and alcohol surfactant reaction product present in an amount of from about 2 to about 10 weight percent; and a process wherein the surfactant HLB, or hydrophilic lipophilic balance is high, for example from about 15 to about 20.

Imaging processes of the present invention in embodiments thereof possess a number of advantages including excellent waterfastness, lightfastness, low product cost, high image resolution, excellent print quality on a variety of substrates, excellent jetting capability with high drop velocity, longer latency, larger drop mass or drop volume which provides optimal optical density in a single pass, high frequency response which allows for high speed printing, excellent printhead recoverability and maintainability, excellent ink stability, minimal ink and pigment settling, a lack of printhead kogation, and more importantly wherein the inks when selected for ink jet processes enables the minimization of paper curl.

Examples of liquid ink vehicles preferably include water, or may comprise a mixture of water and a miscible organic component, such as ethylene glycol, propylene glycol, diethylene glycols, glycerine, dipropylene glycols, polyethylene glycols, polypropylene glycols, amides, ethers, carboxylic acids, esters, alcohols, organosulfides, organosulfoxides, sulfones, dimethylsulfoxide, sulfolane, alcohol derivatives, carbitol, butyl carbitol, cellusolve, ether derivatives, amino alcohols, ketones, and other water miscible materials, and mixtures thereof. The liquid vehicle, preferably water, is generally present in an amount of from about 50 to about 99.5 percent by weight, preferably about 55 to about 95 percent by weigh,t and more preferably from about 60 to about 90 percent by weight, although the amount can be outside these ranges.

When mixtures of water and water miscible organic liquids are selected as the liquid vehicle, the water to organic ratio may be in any effective range, and typically is from about 100:0 to about 30:70, and preferably from about 97:3 to about 50:50, although the ratio can be outside these ranges. The nonwater component of the liquid vehicle generally serves as a humectant which has a boiling point higher than that of water (100° C.). The pigment dispersion can be mixed with different humectants or solvents including ethyleneglycol, diethyleneglycol, propyleneglycol, dipropylene glycol, polyethyleneglycols, polypropylene glycols, glycerine, trimethylolpropane, 1,5 pentanediols, 1,6 hexanediols, diols and triols containing, for example, from 2 to about 10 carbons; sulfoxides, for example dimethyl sulfoxide, alkylphenyl sulfoxides, and the like; sulfones, such as sulfolane, dialkyl sulfones, alkyl phenyl sulfones, and the like; amides like N,N-dialkyl amides, N,N-alkyl phenyl amides, N-methylpyrrolidinone, N-cyclohexylpyrrolidinone, N,N-diethyltoluamide, and the like; ethers such as alkyl ether derivatives of alcohol, etherdiols, and ethertriols including butylcarbitol, alkyl polyethyleneglycols, and the like; urea, betaine, the thio (sulfur) derivatives of the aforementioned materials, for example thioethyleneglycol, trithioethyleneglycol, and the like. Desired penetrants, water soluble polymers, pH buffer, biocides, chelating agents, EDTA and the like, and optional additives can also be selected for the inks, and which additives are individually present in, for example, an amount of from about 0.1 to about 10 weight percent.

Examples of surfactants include the alcohol surfactants illustrated herein, and more specifically, a mixture of secondary alcohols reacted with ethylene oxide in which the secondary alcohols contain, for example, between about 11 and about 15 carbons, and wherein the secondary alcohol based surfactant is of the Tergitol 15-S series surfactants available from Union Carbide. Examples of surfactants include those of the general formula $C_{11-15}$ $H_{23-31}$ $O[CH_2CH_2O]_xH$, wherein x represents a suitable number, such as from about 9 to about 40, and which surfactants include 1) Tergitol 15-S-40 surfactant with a degree of ethoxylation (mole/mole, average) of 41.1, a calculated HLB value of 18.0 and a molecular weight in the range of about 1,800 to 2,100; 2) Tergitol 15-S-30 surfactant with a degree of ethoxylation (mole/mole, average) of 31.0, a calculated HLB value of 17.5 and a molecular weight in the range of about 1,440 to 1,640; 3) Tergitol 15-S-20 surfactant with a degree of ethoxylation (mole/mole, average) of 20.1, a calculated HLB value of 16.4 and a molecular weight in the range of about 1,020 to 1,150; 4) Tergitol 15-S-15 surfactant with a degree of ethoxylation (mole/mole, average) of 15.5, a calculated HLB value of 15.6 and a molecular weight in the range of about 850 to 920; 5) Tergitol 15-S-9 surfactant with a degree of ethoxylation (mole/mole, average) of 8.9, a calculated HLB value of 13.3 and a calculated molecular weight in the range of about 584, and the like. These surfactants have excellent solubility in water and their cloud point (1 percent solution) is, for example, above about 60° C. With cosolvents, such as sulfolane, thiodiglycol, and the like present in the ink in amounts ranging from about 1 to about 50 and preferably from about 5 to about 40 weight percent, the surfactants can be selected in concentrations, or amounts ranging from about 0.001 to about 10.0 weight percent and preferably about 0.0056, 0.018, 0.028, 0.071 and 0.22 weight percent to about 8 weight percent of surfactant, such as Tergitol 1 5-S-9, 15-S-15, 15-S-20, 15-S-30, 15-S-40, respectively. The lower effective concentrations correspond to the critical micelle concentrations of the selected surfactants. The surfactants of the present invention are preferably used in the absence of conventional penetrants such as butyl carbytol, cyclohexylpyrrolidinone, and low molecular weight alcohols such as methanol, ethanol, propanol, butanol and isopropanol for optimum print quality, that is excellent optical density, edge raggedness at dry time of less than about 10 seconds. Other Tergitol surfactants can also be selected in combination with the aforementioned surfactants, such as, for example, Tergitol 15-S-3, HLB=8.3; 15-S-5, HLB=10.6; and 15-S-7, HLB=12.4. The weight percent of each surfactant in the mixture is selected so as to satisfy two conditions: 1) HLB effectiveness:weight percent of surfactant A times the HLB of surfactant A+weight percent of surfactant B times the HLB of surfactant B>13; 2) the surfactant mixture is to remain soluble in the ink up to a temperature of 60° C.

The colorant for the ink compositions of the present invention is preferably a pigment, or a mixture of one or more pigments. The pigment can be black, cyan, magenta, yellow, red, blue, green, brown, mixtures thereof, and the like, and is preferably the carbon black Levanyl obtained from Bayer. Examples of suitable black pigments include various carbon blacks such as channel black, furnace black, lamp black, and the like. Colored pigments include red, green, blue, brown, magenta, cyan, and yellow particles, as well as mixtures thereof. Illustrative examples of magenta pigments include 2,9-dimethyl-substituted quinacridone and anthraquinone, identified in the Color Index as Cl 60710, Cl Solvent Red 19, and the like. Illustrative examples of suitable cyan pigments include copper tetra-4-(octadecyl sulfonamido) phthalocyanine, X-copper phthalocyanine pigment, listed in the Color Index as Cl 74160, Cl Pigment Blue, and Anthradanthrene Blue, identified in the Color Index as Cl 69810, Special Blue X-2137, and the like. Illustrative examples of yellow pigments that can be selected include diarylide yellow 3,3-dichlorobenzidene acetoacetanilides, a monoazo pigment identified in the Color Index as Cl 12700, Cl Solvent Yellow 16, a nitrophenyl amine sulfonamide identified in the Color Index as Foron Yellow SE/GLN, Cl Dispersed Yellow 33, 2,5-dimethoxy-4-sulfonanilide phenylazo-4'-chloro-2,5-dimethoxy acetoacetanilide, Permanent Yellow FGL, and the like. The preferable pigment dispersions include carbon blacks, such as Hostafine Black (T and TS), Sunsperse 9303, and Levanyl Black A-SF. Of these, Levanyl Black A-SF is one of the most preferred.

Preferably, the pigment particle size is small to enable a stable colloidal suspension of the particles in the liquid vehicle and to prevent clogging of the ink channels when the ink is used in a thermal ink jet printer. Preferred particle average diameters are generally from about 0.001 to about 5 microns, and more preferably from about 0.01 to about 3 microns, although the particle size can be outside these ranges. A preferred pigment particle size includes particles having at least 70 percent of the particles being below about 0.1 micron with no particles being greater than about 1.0 micron as measured on a Hodaka CAPA 700 Particle Size Analyzer. More preferably, the pigment particle size includes particles having at least 90 percent of the pigment particles being below 0.1 micron with substantially no pigment particles being greater than about 1.0 micron.

The pigment is present in the ink composition in various effective amounts and generally from about 1 to about 20 percent by weight, preferably from about 3 to about 10 percent by weight, more preferably from about 4 to about 9 percent by weight, and most preferably in embodiments from about 5 to about 8 percent, although the amounts may be outside of these ranges.

Polymeric additives can also be added to the inks to enhance the viscosity of the ink, including water soluble polymers such as Gum Arabic, polyacrylate salts, polymethacrylate salts, polyvinyl alcohols, hydroxy propylcellulose, hydroxyethylcellulose, polyvinylpyrrolidinone, polyvinylether, starch, polysaccharides, polyethyleneimines derivatized with polyethylene oxide and polypropylene oxide, such as the Discole® series available from DKS International, Tokyo, Japan, the JEFFAMINE® series available from Texaco, Bellaire, Texas, and the like. Polymeric additives may be present in the ink in amounts of from 0 to about 10 percent by weight, preferably from about 0.001 to about 8 percent by weight, and more preferably from about 0.01 to about 5 percent by weight, although the amount may be outside these ranges.

Additives can be included in the inks, such as biocides like DOWICIL® 150, 200, and 75, benzoate salts, sorbate salts, and the like, present in an amount of, for example, from 0 to about 10 percent by weight, preferably from about 0.001 to about 8 percent by weight, and more preferably from about 0.01 to about 4.0 percent by weight, although the amount may be outside these ranges; penetration control additives such as N-methylpyrrolidinone, sulfoxides, ketones, lactones, esters, alcohols, butyl carbitol, benzyl alcohol, cyclohexylpyrrolidinone, 1,2-hexanediol, and the like, present in an amount of from 0 to about 50 percent by weight, and preferably from about 5 to about 40 percent by weight, although the amount may be outside these ranges; pH controlling agents, such as acids or bases, phosphate salts, carboxylates salts, sulfite salts, amine salts, and the like, present in an amount of from 0 to about 1 percent by weight, preferably from about 0.001 to about 1 percent by weight, and more preferably from about 0.01 to about 1 percent by weight, although the amount can be outside these ranges; and the like.

Other examples of suitable ink additives include those illustrated in U.S. Pat. No. 5,223,026 and U.S. Pat. No. 5,207,825, the disclosures of each of which are totally incorporated herein by reference.

Aqueous ink compositions according to the present invention may be generated by mixing the pigment, water, and the surfactant or reaction product or surfactant mixtures, for example from 2 to about 5 surfactant reaction products. The mixing can be accomplished by various methods including homogenizing, sonification, microfluidization, mechanical mixing, magnetic stirring, high speed jetting, and the like. The sonification process is preferred since such process provides a homogeneous dispersion by evenly distributing the dispersant throughout the pigment dispersion.

The dispersed pigment can be used as an ink as is, but preferably the thoroughly mixed pigment ink mixture is first centrifuged by a batch process or a continuous process utilizing commercially available equipment, such as bottle centrifuges, preparative ultracentrifuges, analytical ultracentrifuges, zonal centrifuges, tubular centrifuges, disk centrifuges, continuous conveyor-discharge centrifuges, basket centrifuges, liquid cyclones, and the like to remove large pigment particles from the ink. Centrifuging should be conducted for a time sufficient to remove large size particles and at a rate of about 4,000 to 8,000 rpm. The continuous centrifuge process may be selected for the commercial production of large quantities of pigment ink and for the separation of large pigment particles from the ink. The ink is also preferably subjected to a filtration process which utilizes various commercial filtration media including cartridges constructed from nylon, polyester, TEFLON®, polysulfone, and other suitable polymeric materials; membranes; porous ceramic media; cloth; and the like. The filter should be of a size to remove particles greater than 3 $\mu$m in size, preferably greater than 1.2 $\mu$m in size, most preferably greater than 1 $\mu$m in size. Any suitable filtration method, such as continuous and/or batch filtration methods, may be used. Continuous filtration methods are preferred for large scale production of pigment inks. Inks which have been centrifuged and filtered so as to preferably remove particles greater than 1 $\mu$m in size from the ink are suitable for use as ink jet inks because of their ability to not clog the ink jet and their long latency and jetting stability.

The surface tensions, measured on a Kruss tensiometer model K10T at 25° C., of the pigment dispersions are equal to or greater than about 40 dynes/cm$^2$ and less than about 65 dynes/cm$^2$, preferably greater than about 45 dynes/cm$^2$ and more preferably greater than about 50 dynes/cm$^2$. Ink compositions according to the invention possess surface tensions greater than 30 dynes/cm$^2$, preferably greater than 35 dynes/cm$^2$, and more preferably greater than 40 dynes/cm$^2$, for example from about 40 to about 65. The viscosity, obtained at room temperature from a Brookfield model LV with UL adapter, of the ink composition is less than about 3.0 cps, preferably less than about 2.5 cps, and more preferably less about 2.0 cps with a lower value of, for example, about 1.2 cps.

The inks of the present invention possess excellent latency. Latency refers to the amount of time that an ink jet cartridge can be left idle without affecting the printing performance as measured by the lack of a first drop upon resuming the printing process. Generally, the inks possess a latency of at least 20 seconds, more generally about 30 seconds to as high as about 1,000 seconds, with a minimum latency of at least about 30 seconds being preferred.

The ink may be applied to a suitable substrate in imagewise fashion. Application of the ink to the substrate can be by any suitable process compatible with aqueous-based inks, such as flexographic printing, pen plotters, continuous stream ink jet printing, drop-on-demand ink jet printing, including both piezoelectric and thermal ink jet processes, and the like. The substrate employed can be any substrate compatible with aqueous-based inks, including plain paper, such as Xerox® series 10 paper, Xerox® 4024 paper, or the like, coated papers, such as those available from Jujo Inc., transparencies, materials suitable for aqueous inks or ink jet printing processes, and the like.

Embodiments of the present invention include an imaging process which comprises the development of an image with an aqueous ink jet ink composition comprised of pigment, water, and an alcohol surfactant comprised of a mixture of linear secondary alcohols, and which mixture has been reacted with ethylene oxide; an imaging process wherein the surfactant reaction product comprised of a mixture of linear secondary alcohols reacted with ethylene oxide is of the general structural formula $C_{11-15}$ $H_{23-31}$ $O[CH_2CH_2O]_xH$ wherein x is a number of from about 9 to about 40, and which product is of a number average molecular weight of from about 500 to about 2,000, and wherein images with minimal curling and minimal smearing are obtained; a process wherein a surfactant mixture containing Tergitol 15-S-3, Tergitol 15-S-5, or Tergitol 15-S-7 with a HLB of 8.3, 10.6 and 12.4, respectively, is selected; a process wherein the formula x is 9 and the product is Tergitol 15-S-9 with an HLB of 13.3; a process wherein the surfactant is selected in an amount of from 0.005 to about 20 weight percent, and the surfactant HLB, or hydrophile/lipophile balance is from about 13 to about 20; a process wherein the surfactant is selected in an amount of from 0.005 to about 10 weight percent, and the surfactant HLB, or hydrophile/lipophile balance is from about 13 to about 20; a process wherein the surfactant HLB, or hydrophile/lipophile balance is from 14 to 19; a process wherein the pigment is carbon black, cyan pigment, magenta pigment, yellow pigment, or mixtures thereof; a process wherein the pigment possesses a volume average particle size distribution wherein at least 70 weight percent of the pigment particles have a diameter of less than about 0.10 $\mu$m with the remaining particles having a volume average diameter of less than about 1.0 $\mu$m; a process wherein the inks possess a latency of at least 20 seconds; a high resolution printing process comprising applying in imagewise fashion to a substrate in a printer having at least one nozzle of a channel width or diameter ranging from about 10 to about 40 microns an aqueous ink jet ink composition comprised of pigment, water, and an alcohol surfactant comprised of a mixture of linear secondary alcohols and which mixture is reacted with ethylene oxide; a process wherein the substrate is paper and paper curl is minimized or avoided; a process wherein the substrate is paper and image smearing is minimized or eliminated; a process wherein the printing process is conducted by a 600 dpi ink jet printer; a process for reducing or eliminating paper curl in a xerographic ink jet apparatus which comprises generating images in said apparatus and developing said images with an aqueous ink jet ink composition comprised of pigment, water, and an alcohol surfactant comprised of a mixture of linear secondary alcohols reacted with ethylene oxide; a process wherein the surfactant is present in an amount of from about 1 to about 10 weight percent; a process wherein the surfactant HLB, or hydrophile/lipophile balance is from about 13 to about 20; an ink comprised of pigment, water, and an alcohol surfactant comprised of a mixture of linear secondary alcohols reacted with ethylene oxide; and an ink comprised of pigment, water, and an alcohol surfactant comprised of mixtures of linear secondary alcohols, which alcohols reacted with ethylene oxide, and wherein the reaction product is of the general formula $C_{11-15}$ $H_{23-31}$ $O[CH_2CH_2O]_xH$ wherein x is a number of from about 9 to about 40, and which product is of a molecular weight $M_n$ of from about 500 to about 2,000.

The following Examples are provided. In the first three Examples, Examples A, B and C, fast drying cyan inks containing penetrants, such as butyl carbitol, cyclohexyl pyrrolidinone and isopropanol, were prepared with (sample B and C)/without (sample A) surfactants. These inks were found to have a drying time of at least 1 second (shorter dry times could not be measured accurately), and an optical density, which was between 1.1 and 1.15 and poor edge raggedness, between 23 and 26 microns. By contrast, the inks formulated with secondary alcohol surfactants identified in the enclosed Table, Samples 1 to 7, were found to have optical densities between 1.22 and 1.39 for drying times ranging from less than 1 second to 9 seconds, respectively. A significant decrease in edge raggedness value was achievable when less than 4 weight percent of surfactant was used in the inks of the present invention, Examples III to VII. Excellent performance was achieved for ink samples containing 1 to 4 weight percent, preferably 2 to 4 weight percent of the secondary surfactant having an HLB value of 15.6, for example the Tergitol 15-S- 15.

In the following Examples, the optical density of the image (wire side paper) was obtained from a Macbeth TR927 density meter.

EXAMPLE A
Using Butyl Carbitol and Cyclohexyl Pyrrolidinone as Penetrants Instead of Surfactants of the Present Invention:

An ink composition was prepared as follows. In a suitable bottle were mixed 37.97 grams of deionized water, 15.0 grams of a solution containing 97 percent by weight of sulfolane and 3 percent by weight of water (obtained from Phillips 66 Company). Thereafter, 35.0 grams of Projet Cyan 1, (obtained from Zeneca Corporation as a 10 percent by weight of this dye in water), 10.0 grams of butyl carbitol (obtained from Aldrich Chemical), 2.0 grams of 1-cyclohexyl-2-pyrrolidinone (obtained from Aldrich Chemical), and 0.03 gram of polyethylene oxide, $M_w$=18,500 (obtained from Polysciences) were added to the bottle. The bottle was then heated at 50° C. for 1 hour. The cooled ink mixture was then filtered through a 0.45 micron filter. The physical properties of the filtered ink were measured at 25° C. The viscosity was obtained from a Brookfield model LV with UL adapter and the surface tension from a Kruss tensiometer model K10T. The viscosity and surface tension were, respectively, 1.80 Cp, 34.3 mN/m. The ink was then utilized in an HP 500C color printer and provided images of low optical density, that is 1.11, on Xerox 4024DP paper and the drying was about 1 to 2 seconds. The edge raggedness error measured on a four pixel line printed with this ink was found to be 26 microns.

EXAMPLE I

An ink composition was prepared as follows. In a bottle were mixed 48.0 grams of deionized water, 4.0 grams of a solution containing 97 percent by weight of sulfolane and 3 percent by weight of water (obtained from Phillips 66 Company). Thereafter, 40.0 grams of Projet Cyan 1, (obtained from Zeneca Corporation as a 10 percent by weight of the dye in water), 8.0 grams of Union Carbide Tergitol 15-S-15, a mixture of linear secondary alcohols reacted with ethylene oxide, and wherein the product is of the general structural formula $C_{11\text{-}15}$ $H_{23\text{-}31}$ $O[CH_2CH_2O]_xH$ (HLB number of 15.6) (obtained from Union Carbide Chemicals and Plastics Company Inc.), were added to the bottle. The bottle was then heated at 50° C. for 1 hour. The cooled ink mixture was then filtered through a 0.45 micron filter. The physical properties of the filtered ink were measured at 25° C. The viscosity, surface tension and pH were, respectively, 1.70 Cp, 36.0 mN/m and 7.21. The ink was printed on an HP 500C color printer to provide images of 1.22 optical density on Xerox 4024DP paper and drying times were about 1 to 2 seconds. The edge raggedness error measured on a four pixel line printed with this ink was found to be 24 microns. The main advantage of this ink compared to the previous Example A containing conventional penetrants was the higher optical density which was achieved without the need to increase the concentration of colorant.

EXAMPLE II

An ink composition was prepared as follows. In a bottle were mixed 50.0 grams of deionized water, 4.0 grams of a solution containing 97 percent by weight of sulfolane and 3 percent by weight of water (obtained from Phillips 66 Company). Thereafter, 40.0 grams of Projet Cyan 1, (obtained from Zeneca Corporation as a 10 percent by weight of the dye in water), 6.0 grams of Tergitol 15-S-15, a mixture of linear secondary alcohols reacted with ethylene oxide of the general structural formula $C_{11\text{-}15}$ $H_{23\text{-}31}$ $O[CH_2CH_2O]_xH$ wherein x is 15 (HLB number of 15.6) (obtained from Union Carbide Chemicals and Plastics Company Inc.), were added to the bottle. The bottle was then heated at 50° C. for 1 hour. The cooled ink mixture was then filtered through a 0.45 micron filter. The physical properties of the filtered ink were measured at 25° C. The viscosity, surface tension and pH were, respectively, 1.68 Cp, 34.3 mN/m and 7.30. The ink was printed on an HP 500C color printer to provide images of a 1.25 optical density on Xerox 4024DP paper and drying times of about 1 second. The edge raggedness error measured on a four pixel line printed with this ink was found to be 27 microns. The main advantage of this ink compared to the previous Example A inks containing conventional penetrants was the higher optical density which was achieved without the need to increase the concentration of colorant.

EXAMPLE III

An ink composition was prepared as follows. In a bottle were mixed 52.0 grams of deionized water, 4.0 grams of a solution containing 97 percent by weight of sulfolane and 3 percent by weight of water (obtained from Phillips 66 Company). Thereafter, 40.0 grams of Projet Cyan 1, (obtained from Zeneca Corporation as a 10 percent by weight of the dye in water), 4.0 grams of Tergitol 15-S-15, a mixture of linear secondary alcohols reacted with ethylene oxide of the general structural formula $C_{11\text{-}15}$ $H_{23\text{-}31}$ $O[CH_2CH_2O]_xH$ wherein x is 15 (HLB number of 15.6) (obtained from Union Carbide Chemicals and Plastics Company Inc.), were added to the bottle. The bottle was then heated at 50° C. for 1 hour. The cooled ink mixture was then filtered through a 0.45 micron filter. The physical properties of the filtered ink were measured at 25° C. The viscosity, surface tension and pH were, respectively, 1.19 Cp, 35.9 mN/m and 7.27. The ink was printed on an HP 500C color printer to give images of a 1.25 optical density on Xerox 4024DP paper and drying times of 1 to 2 seconds. The edge raggedness error measured on a four pixel line printed with this ink was found to be 19 microns. The main advantage of this ink compared to the previous Example A inks containing conventional penetrants was the higher optical density and lower edge raggedness which was achieved without the need to increase the concentration of colorant and while retaining drying time at 1 to 2 seconds.

EXAMPLE IV

An ink composition was prepared as follows. In a bottle were mixed 54.0 grams of deionized water, 4.0 grams of a solution containing 97 percent by weight of sulfolane and 3 percent by weight of water (obtained from Phillips 66 Company). Thereafter, 40.0 grams of Projet Cyan 1, (obtained from Zeneca Corporation as a 10 percent by weight of the dye in water), 2.0 grams of Tergitol 15-S-15 (obtained from Union Carbide throughout the Examples), a mixture of linear secondary alcohols reacted with ethylene oxide of the general structural formula $C_{11-15}$ $H_{23-31}$ $O[CH_2CH_2O]_xH$ wherein x is 15 (HLB number of 15.6) (obtained from Union Carbide Chemicals and Plastics Company Inc.), were added to the bottle. The bottle was then heated at 50° C. for 1 hour. The cooled ink mixture was then filtered through a 0.45 micron filter. The physical properties of the filtered ink were measured at 25° C. The viscosity, surface tension and pH were, respectively, 1.19 Cp, 35.5 mN/m and 7.34. The ink was printed on an HP 500C color printer to give images of a 1.31 optical density on Xerox 4024DP paper and drying times of 4 seconds. The edge raggedness error measured on a four pixel line printed with this ink was found to be 14 microns. The main advantages of this ink compared to the Example A containing conventional penetrants is the higher optical density and lower edge raggedness which was achieved without the need to increase the concentration of colorant and while retaining the drying time at 4 seconds.

EXAMPLE V

An ink composition was prepared as follows. In a bottle were mixed 48.9 grams of deionized water, 4.0 grams of a solution containing 97 percent by weight of sulfolane and 3 percent by weight of water (obtained from Phillips 66 Company). Thereafter, 40.0 grams of Projet Cyan 1, (obtained from Zeneca Corporation as a 10 percent by weight of the dye in water), 5 grams of thiodiglycol (obtained from Aldrich Chemicals), and 2.0 grams of Tergitol 15-S-1 5, a mixture of linear secondary alcohols reacted with ethylene oxide of the general structural formula $C_{11-15}$ $H_{23-31}$ $O[CH_2CH_2O]_xH$ wherein x is 15 (HLB number of 15.6) (obtained from Union Carbide Chemicals and Plastics Company Inc.), were added to the bottle. The bottle was then heated at 50° C. for 1 hour. The cooled ink mixture was then filtered through a 0.45 micron filter. The physical properties of the filtered ink were measured at 25° C. The viscosity, surface tension and pH were, respectively, 1.53 Cp, 35.8 mN/m and 7.23. The ink was printed on an HP 500C color printer to give images of a 1.33 optical density on Xerox 4024DP paper and drying times of 3 seconds. The edge raggedness error measured on a four pixel line printed with this ink was found to be 20 microns. The main advantage of this ink compared to the Example A ink containing conventional penetrants was the higher optical density and lower edge raggedness which was achieved without the need to increase the concentration of colorant and while retaining the drying time below 4 seconds.

EXAMPLE VI

An ink composition was prepared as follows. In a bottle were mixed 53.97 grams of deionized water, 4.0 grams of a solution containing 97 percent by weight of sulfolane and 3 percent by weight of water (obtained from Phillips 66 Company). Thereafter, 40.0 grams of Projet Cyan 1 (obtained from Zeneca Corporation as a 10 percent by weight of the dye in water), 5 grams of thiodiglycol (obtained from Aldrich Chemicals) and 1.0 gram of Tergitol 15-S-20, a mixture of linear secondary alcohols reacted with ethylene oxide of the general structural formula $C_{11-15}$ $H_{23-31}$ $O[CH_2CH_2O]_xH$ wherein x is 20 (HLB number of 16.4) (obtained from Union Carbide Chemicals and Plastics Company Inc.), were added to the bottle. The bottle was then heated at 50° C. for 1 hour. The cooled ink mixture was then filtered through a 0.45 micron filter. The physical properties of the filtered ink were measured at 25° C. The viscosity, surface tension and pH were, respectively, 1.41 Cp, 37.8 mN/m and 7.13. The ink was printed on an HP 500C color printer to provide images of a 1.31 optical density on Xerox 4024DP paper and drying times of 6 seconds. The edge raggedness error measured on a four pixel line printed with this ink was found to be 12 microns. The main advantage of this ink compared to the Example A ink containing conventional penetrants was the higher optical density and lower edge raggedness which was achieved without the need to increase the concentration of colorant and while retaining drying time at below 7 seconds.

EXAMPLE VII

An ink composition was prepared as follows. In a bottle were mixed 53.97 grams of deionized water, 4.0 grams of a solution containing 97 percent by weight of sulfolane and 3 percent by weight of water (obtained from Phillips 66 Company). Thereafter, 40.0 grams of Projet Cyan 1, (obtained from Zeneca Corporation as a 10 percent by weight of the dye in water), 5 grams of thiodiglycol (obtained from Aldrich Chemicals), and 1.0 gram of Tergitol 15-S-30, a mixture of linear secondary alcohols reacted with ethylene oxide of the general structural formula $C_{11-15}$ $H_{23-31}$ $O[CH_2CH_2O]_xH$ wherein x is 30 (HLB number of 17.5) (obtained from Union Carbide Chemicals and Plastics Company Inc.), were added to the bottle. The bottle was then heated at 50° C. for 1 hour. The cooled ink mixture was then filtered through a 0.45 micron filter. The physical properties of the filtered ink were measured at 25° C. The viscosity, surface tension and pH were, respectively, 1.45 Cp, 40.5 mN/m and 7.15. The ink was printed on an HP 500C color printer to provide images of a 1.39 optical density on Xerox 4024DP paper and drying times of 6 seconds. The edge raggedness error measured on a four pixel line printed with this ink was found to be 14 microns. The main advantage of this ink compared to the Example A ink containing conventional penetrants was the higher optical density and lower edge raggedness which was achieved without the need to increase the concentration of colorant and while retaining the drying time below 7 seconds.

The following Table illustrates the advantages of using T-shaped (Tergitol) surfactant product with a HLB value between 15 and 18 for the formulation of fast drying inks (<10s) with high optical density (better color gamut) and low edge raggedness (<20 microns). All inks prepared with conventional penetrants, such as butyl carbitol, cyclohexylpyrrolidinone and isopropanol, generated images of lower optical densities than the inks containing the above surfactants. The optimum T-shaped surfactant has an HLB value of 15.6, and it is used at concentrations between 1 and 4 and preferably between 2 and 4 (well above the critical micelle concentration of the surfactant). Under these conditions, the viscosity is significantly lower (higher frequencies of jetting are possible), the optical density achievable with the inks is about 0.2 OD unit higher, the drying time is less than 5 seconds, and the edge raggedness associated with a 4 pixel line is as indicated.

| | Viscosity cP | Surface Tension mN/m | HLB Surfactant wt. percent | OD | DT s | Edge Raggedness Micron |
|---|---|---|---|---|---|---|
| A | 1.80 | 34.3 | No Surfactant, Butyl Carbitol/ Cyclohexyl-pyrrolidinone | 1.11 | <1 | 26 |
| 1 | 1.70 | 36.0 | 15.6, 8 | 1.22 | <1 | 24 |
| 2 | 1.68 | 34.3 | 15.6, 6 | 1.25 | <1 | 27 |
| 3 | 1.19 | 35.9 | 15.6, 4 | 1.25 | 2 | 19 |
| 4 | 1.19 | 35.5 | 15.6, 2 | 1.31 | 4 | 14 |
| 5 | 1.53 | 35.8 | 15.6, 2 Thiodiglycol | 1.33 | 3 | 20 |
| 6 | 1.41 | 37.8 | 16.4, 1 Thiodiglycol | 1.31 | 6 | 12 |
| 7 | 1.45 | 40.5 | 17.5, 1 Thiodiglycol | 1.39 | 9 | 14 |

Other modifications of the present invention may occur to those of ordinary skill in the art subsequent to a review of the present application, and these modifications, including equivalents thereof, are intended to be included within the scope of the present invention.

What is claimed is:

1. An imaging process which comprises the development of an image with an aqueous ink jet ink composition comprised of colorant, water, and an alcohol surfactant comprised of a mixture of linear secondary alcohols, and which mixture has been reacted with ethylene oxide.

2. An imaging process in accordance with claim 1 wherein the surfactant reaction product comprised of a mixture of linear secondary alcohols reacted with ethylene oxide is of the general formula $C_{11-15}$ $H_{23-31}$ $O[CH_2CH_2O]_xH$ wherein x is a number of from about 9 to about 40, and which product is of a number average molecular weight of from about 500 to about 2,000.

3. A process according to claim 2 wherein x is 9 and the product possesses an HLB of 13.3.

4. A process according to claim 1 wherein the surfactant is selected in an amount of from 0.005 to about 20 weight percent, and the surfactant HLB, or hydrophile/lipophile balance is from about 13 to about 20.

5. A process in accordance with claim 2 wherein the surfactant is selected in an amount of from 0.005 to about 10 weight percent, and the surfactant HLB, or hydrophile/lipophile balance is from about 13 to about 20.

6. A process in accordance with claim 2 wherein the surfactant HLB, or hydrophile/lipophile balance is from 14 to 19.

7. A process in accordance with claim 2 wherein said inks possess a latency of at least about 20 seconds.

8. A process in accordance with claim 1 wherein the colorant is a pigment.

9. A process in accordance with claim 8 wherein said pigment is present in an amount of from about 4 to about 10 percent by weight of said ink composition.

10. A process in accordance with claims 8 wherein said pigment is carbon black, cyan pigment, magenta pigment, yellow pigment, or mixtures thereof.

11. A process in accordance with claim 8 wherein said pigment possesses a volume average particle size distribution wherein at least 70 weight percent of said pigment particles have a diameter of less than about 0.10 μm with the remaining particles having a diameter of less than about 1.0 μm.

12. A process in accordance with claim 1 wherein the colorant is a dye.

13. A process in accordance with claim 1 wherein the ink further contains cosolvents of sulfolane and thiodiglycol.

14. A process in accordance with claim 1 wherein the surfactant is of the formula $C_{11-15}$ $H_{23-31}$ $O[CH_2CH_2O]_xH$ wherein x is 15, and which surfactant has an HLB number of 15.6; is of the formula $C_{11-15}$ $H_{23-31}$ $O[CH_2CH_2O]_xH$ wherein x is 20 and which surfactant possesses an HLB number of 16.4; is of the formula $C_{11-15}$ $H_{23-31}$ $O[CH_2CH_2O]_xH$ wherein x is 30 and which surfactant possesses an HLB number of 17.5; and wherein the colorant is a dye.

15. A process in accordance with claim 14 wherein the ink further contains sulfolane and thiodiglycol.

16. A high resolution printing process comprising applying in image wise fashion to a substrate in a printer having at least one nozzle of a channel width or diameter ranging from about 10 to about 40 microns an aqueous ink jet ink composition comprised of pigment, water, and an alcohol surfactant comprised of a mixture of linear secondary alcohols, and which mixture is reacted with ethylene oxide.

17. A process in accordance with claim 16 wherein the substrate is paper, and paper curl is minimized or eliminated.

18. A process in accordance with claim 16 wherein the substrate is paper, and image smearing and paper curling is minimized or eliminated.

19. A process in accordance with claim 16 wherein said printing process is conducted by a 600 dpi ink jet printer.

20. A process for reducing or eliminating paper curl in a xerographic ink jet apparatus which comprises generating images in said apparatus and developing said images with an aqueous ink jet ink composition comprised of colorant, water, and an alcohol surfactant comprised of a mixture of linear secondary alcohols reacted with ethylene oxide.

21. A process in accordance with claim 20 wherein said surfactant is present in an amount of from about 1 to about 10 weight percent.

22. A process in accordance with claim 20 wherein said surfactant HLB, or hydrophile/lipophile balance is from about 13 to about 20.

23. An ink comprised of pigment, water, and an alcohol surfactant comprised of a mixture of linear secondary alcohols reacted with ethylene oxide.

24. An imaging process which comprises the development of an image with an ink jet composition comprised of a vehicle, colorant, and an alcohol surfactant comprised of a mixture of linear secondary alcohols, and which mixture has been reacted with ethylene oxide.

25. A process in accordance with claim 24 wherein the vehicle is water or is a mixture of water and a miscible organic component.

26. A process in accordance with claim 23 wherein said miscible organic component is ethylene glycol, propylene glycol, diethylene glycol, glycerine, dipropylene glycol, polyethylene glycol, alcohols, esters, organosulfides, organosulfoxides, sulfones, dimethyl sulfoxide, sulfolane, or butyl carbitol.

27. A process in accordance with claim 23 herein said miscible organic component is sulfolane, and the colorant is in the form of a pigment dispersion containing thioethylene glycol.

28. An ink comprised of colorant, water, and an alcohol surfactant comprised of mixtures of linear secondary alcohols, and which alcohols are reacted with ethylene oxide, and wherein the reaction product is of the general formula $C_{11-15}$ $H_{23-31}$ $O[CH_2CH_2O]_xH$ wherein x is a number of from about 9 to about 40.

29. An ink in accordance with claim 28 wherein x is 15.

30. An ink in accordance with claim 28 wherein the surfactant has an HLB number of 15.6.

31. An ink in accordance with claim 28 wherein x is 20.

32. An ink in accordance with claim 28 wherein x is 30.

33. An ink in accordance with claim 28 wherein x is 15, and which surfactant has an HLB number of 15.6; x is 20 and which surfactant has an HLB number of 16.4; x is 30 and which surfactant has an HLB number of 17.5; and wherein the colorant is a dye.

34. An ink in accordance with claim 28 further containing a sulfolane.

35. An ink consisting essentially of colorant, water, and an alcohol surfactant comprised of mixtures of linear secondary alcohols, and which alcohols are reacted with ethylene oxide, and wherein the reaction product is of the general formula $C_{11-15} H_{23-31} O[CH_2CH_2O]_x H$ wherein x is a number of from about 9 to about 40.

* * * * *